United States Patent [19]

Hölzer et al.

[11] 4,334,687
[45] Jun. 15, 1982

[54] SHAFT SEAL WITH MULTI-SLITTED SLEEVE

[75] Inventors: Helmut Hölzer; Ernst M. von Arndt, both of Weinheim, Fed. Rep. of Germany

[73] Assignee: Firma Carl Freudenberg, Weinheim an der Bergstrasse, Fed. Rep. of Germany

[21] Appl. No.: 208,774

[22] Filed: Nov. 20, 1980

[30] Foreign Application Priority Data

Dec. 12, 1979 [DE] Fed. Rep. of Germany ....... 2949839

[51] Int. Cl.³ .................. F16J 15/24; F16J 15/32
[52] U.S. Cl. ................................. 277/151; 277/152; 277/207 R; 277/215; 277/1
[58] Field of Search ............. 277/1, 152, 153, 207 A, 277/215, 151, 207 R, 208–211, 165

[56] References Cited

U.S. PATENT DOCUMENTS

| | | | |
|---|---|---|---|
| 1,532,961 | 4/1925 | Travers | 277/215 |
| 2,097,016 | 10/1937 | Bowen | 277/208 X |
| 2,717,273 | 9/1955 | Anderson | 277/208 X |
| 3,610,639 | 10/1971 | Staats | 277/215 X |

FOREIGN PATENT DOCUMENTS 123352 12/1919 United Kingdom ............... 277/215

*Primary Examiner*—Robert S. Ward, Jr.
*Attorney, Agent, or Firm*—Kenyon & Kenyon

[57] ABSTRACT

A shaft seal for preventing leakage from a gap between a bore hole in a machine housing and a rotating shaft is disclosed. The seal consists of a contact pressure ring of elastic material and a multi-slitted, thin sleeve of polytetrafluoroethylene which is permanently joined to the inner wall of the ring.

17 Claims, 4 Drawing Figures

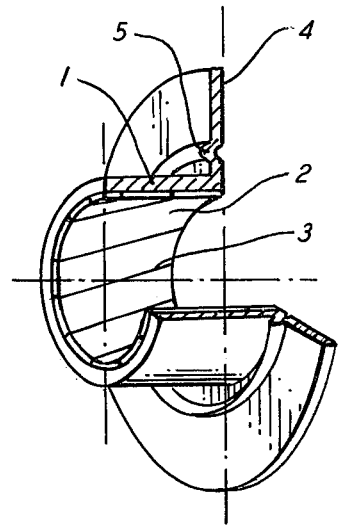
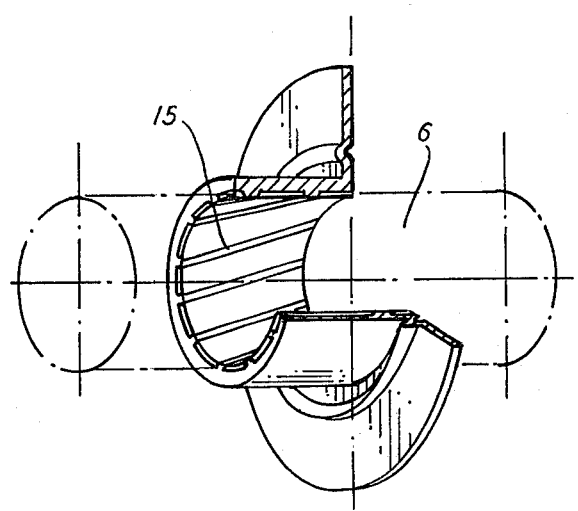
FIG. 1   FIG. 2
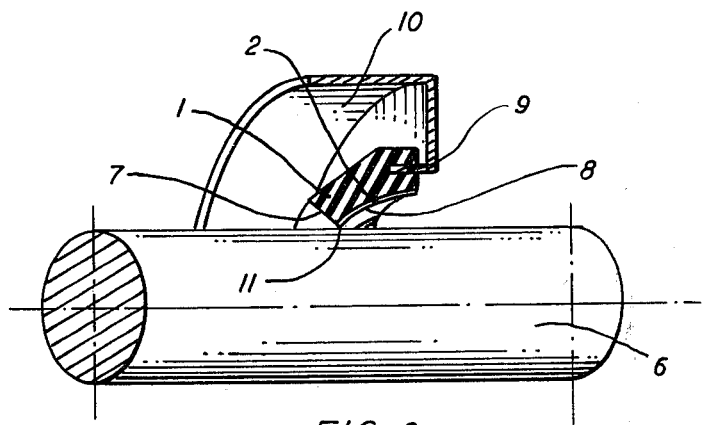
FIG. 3
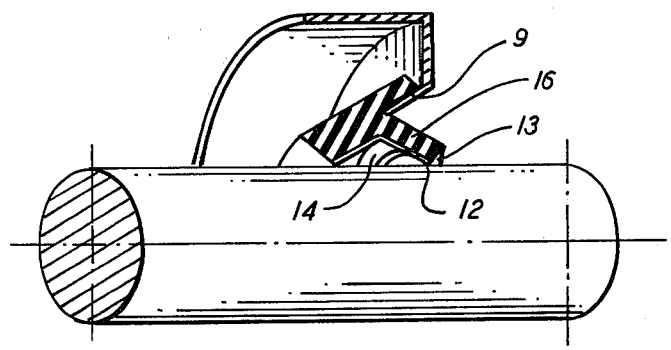
FIG. 4

SHAFT SEAL WITH MULTI-SLITTED SLEEVE

BACKGROUND OF THE INVENTION

The present invention relates to a shaft seal for the gap between a bore hole and a shaft guided therein and is composed of a contact pressure ring with elastic properties and a thin sleeve of polytetrafluoroethylene which is permanently joined to the inner wall of the ring.

A seal of a related type of design is known from Chemie-Ingenieur-Technik, Vol. 27, 1955, page 282, wherein is given the design of a stuffing gland packing for a centrifugal or plunger pump. The contact pressure elements are arranged axially one behind the other with a hat sleeve made from polytetrafluoroethylene and having radial projections serving as a spacer. As is well known, the material of the hat sleeve used has very little mechanical strength which makes it necessary to use a shaft with a high-grade surface. This requirement, however, is very difficult to achieve because of high manufacturing costs and the corrosive and abrasive effects which occur during continuous operation.

OBJECTS OF THE INVENTION

The objects of the invention include the development of a seal of the above type which has improved resistance to mechanical stresses and an increased service life, while ensuring substantially equivalent running and sealing properties.

SUMMARY OF THE INVENTION

These and other objects are achieved by the present invention which combines the better abrasion resistance of elastic materials with the low friction properties of polytetrafluoroethylene. The shaft seal of the present invention prevents leakage around a rotating shaft and comprises a contact pressure ring of elastic material and a multi-slitted thin sleeve of polytetrafluoroethylene which is permanently joined to the inner wall of the ring. The slits in the sleeve form an angle with the axis of shaft rotation of about 5° to about 45°. They extend radially through the complete thickness of the sleeve and extend axially from one end of the sleeve to the other. The inside diameter of the sleeve joined to the ring must be smaller than the diameter of the shaft before the seal is assembled onto the shaft. This feature will cause the slits to open and form channels when the seal is assembled onto the shaft and allow the elastic material of the ring to expand into the channels and contact the shaft.

BRIEF DESCRIPTION OF THE DRAWINGS

The shaft seal of the present invention is exemplified by the drawings but is not limited thereby.

FIG. 1 shows a gap seal in a partially cross-sectional perspective view prior to assembly.

FIG. 2 shows the gap seal of FIG. 1 in relation to the corresponding shaft after assembly.

FIG. 3 shows a lip seal in relation to the sealed shaft after assembly.

FIG. 4 shows an alternative embodiment of a lip seal with two sealing lips arranged at an axial distance from each other.

DETAILED DESCRIPTION OF THE INVENTION

The embodiments herein described explain and exemplify the shaft seal of the present invention. Other modifications will be readily apparent from the description and are also included herein.

The sleeve of polytetrafluoroethylene, hereinafter called PTFE, which is permanently joined to the inside wall of the contact pressure ring, is very thin, preferably of a thickness of about 0.2 to 0.3 mm. The contact pressure ring is vulcanized or cemented to the sleeve using methods known to those familiar with the art. With the latter method, it is necessary that the application of the adhesive does not change the elastic properties of the contact pressure ring. Therefore, only such cementing or bonding compounds can be used which have soft elastic properties in the cross-linked state.

The sleeve is divided axially by the slits which radially extend through the thickness of the sleeve so that several small plates of PTFE are arranged next to each other around the circumference of the shaft. It is advantageous if the boundary edges of the individual plates on both sides of a slit are parallel with each other.

An appropriate mutual relation of the ring and sleeve can be achieved, for example, by the provision that the slits are first made in the sleeve in such a manner that it is not completely cut through. The contact pressure ring is then permanently joined to the outer surface of the sleeve and the final cutting-through of the remaining bridges at the bases of the slits is produced in the course of the elastic expansion of the seal in the assembly. This division into plates exposes the material of the contact pressure ring in the resulting channels and the material then comes into contact with the surface of the sealed shaft because of its elasticity and the very small thickness of the sleeve. The good low friction properties of the PTFE sleeve are thereby superimposed upon the better abrasion resistance on the contact pressure ring and excellent working and sealing properties are thereby obtained.

It has been found that a particularly advantageous width of the channels (expanded slits) can be obtained when using a contact pressure ring of a rubber-elastic material if the ratio of the inside diameter of the sleeve before expansion to the outside diameter of the shaft is about 0.85 to about 0.95. Preferably, several channels at uniform spacings are distributed around the outside circumference of the shaft. The number of channels and the spacings are preferably arranged so that the ratio of the width of the plates in the circumferential direction to the width of the channels in the assembled seal is maximally about 15.

The slits must not extend perpendicularly to the axis of rotation of the shaft because in such an arrangement, no expansion in the transverse direction can be obtained. It has been found that the maximum angle formed by the slits in relation to the axis must not exceed 45°. In addition, the use of angles of less than 5° will not produce the advantages of the present invention because with such small angles, the sealing of a rotating shaft is influenced substantially by torsion effects caused by the magnitude of the angle. The use of such small angles must therefore be tested in detail. Further it is preferable to choose the general helix of the slits so that rotation of the shaft in relation to the twist of the slits, i.e., clockwise or counterclockwise, will produce a conveyance effect in the direction of the sealed-off space.

The slits can be related at the same angle to the axis of rotation along their entire lengths, i.e., they can be straight. It is also possible to give a curved shape to the slits whereby a differential angular relation to the axis of rotation is obtained with respect to points along the lengths of the slits. This last-mentioned embodiment has special significance for shaft seals with a sharp-cornered sealing lip, wherein the PTFE sleeve expands conically from the lip to a larger diameter. With increasing distance from the surface of the sealed shaft, differing transport effects are obtained therefrom, which can be taken into consideration in an advantageous manner by an appropriately curved shape of the slit. It is preferred that the average of the differential angle along the length of each curved slit which is formed in relation to the axis of rotation, be between about 10° and about 30°.

In a further embodiment, the sleeve can have a second series of slits with a mirror-symmetry arrangement in relation to the parallel first series of slits. In addition, the two series of mirror symmetric slits may be arranged but are not required to be arranged so that they intersect each other. Such a design brings about a dynamic sealing effect in connection with shafts which turn alternatingly clockwise and counterclockwise.

The seal of the present invention can be designed as a gap seal, in which the inside surface of the PTFE sleeve rests upon the surface of the sealed shaft. In another design, the seal of the present invention can be a lip seal. This type of seal would be formed, for example, by bevelling the end faces of the contact pressure ring and forming a circular sealing lip by raising the interior pattern of the inner diameter surface of the seal up off the shaft. The raising is typically produced through use of a stiffening element. It has been found to be particularly advantageous if the stiffening element is a ring with a U-shaped profile open in the direction of the sealed-off medium, and the contact pressure ring has a circular slot in its face into which the inner leg or projection of the stiffening ring fits.

The sealing effect is brought about in the above-described type of embodiment by sealing lips which rest on the surface of the sealed shaft along a circular line of extremely small width. The friction heat produced can be removed from this narrow zone by the recirculation of the lubricant or by the outside air to a sufficient extent, so that detrimental changes of the mechanical properties of the contact pressure ring are largely avoided during extended periods of operation. This feature is of special importance for the service life that can be expected from the development of dust lips of this type which normally are not wetted by lubricant.

The seal of the present invention in the form of both a gap seal and a lip seal can be fabricated from a hollow cylinder of elastic material, typically of natural or synthetic rubber. The only differentiating feature is that in a gap seal the elastic expansion caused by the assembly is uniformly made over the entire axial length and the entire inside surface of the seal rests with equal pressure against the surface of the sealed shaft.

In contrast, a lip seal of the present invention is differentially expanded along the axial direction in such a manner that the lip or lips at the corresponding end face or faces are expanded to the diameter of the shaft while the interior region or portion of the inner diameter surface is expanded to a greater degree. Due to this differential expansion, the inner edge of the seal at the end face rests at an angle against the surface of the sealed shaft and forms the sealing lip. Depending on the bevel of the corresponding end face and the larger expansion of the interior region of the inner diameter surface, certain cone angles between the flank surfaces defining the sealing lip and the surface of the sealed shaft are obtained. These angles can be adjusted by variation of the bevel and the interior region expansion to create optimum sealing effects with respect to the medium sealed off.

Reference to the drawings and the following descriptions of them will further exemplify typical embodiments of the present invention.

A gap seal of the present invention, as depicted in FIG. 1, consists of a contact pressure ring 1 of a soft elastic material, for example, an acrylonitrile-butadiene rubber with a Shore hardness of 75° Shore A. The inner surface of the contact pressure ring is permanently joined to a sleeve 2 of PTFE of uniform thickness. Typically the sleeve will have a thickness of about 0.25 mm. The sleeve is axially divided by numerous slits 3 into a multiplicity of plates of relatively small width which are uniformly distributed around the circumference. As depicted in FIG. 1, the slits form an angle of 28° with the axis of rotation.

A flange-like projection 4 is connected to ring 1 by a transition piece of diaphragm-like design. The projection serves for anchoring the seal to the receiving housing bore hole in a liquid-tight manner. Through the transition piece of diaphragm-like design, the seal, consisting of the contact pressure ring 1 and the sleeve 2, can follow the movements of the sealed shaft with especially little resistance.

The seal depicted in FIG. 1 is shown in FIG. 2 in the assembled form where, by pushing the seal onto the shaft, an elastic expansion is obtained whereby the slits expand to form channels and the corresponding boundary edges of the plates adjacent to each other assume a spacing dimension. It is through these channels 15 that the elastic material of the contact pressure ring makes contact with the surface of the sealed shaft. A given point on the surface of the sealed shaft thereby passes in one revolution successively through alternating regions of the PTFE of the sleeve and the elastomer material of the contact pressure ring. From this arrangement, the overall properties of the seal produced are excellent abrasion resistance as well as low friction under unfavorable conditions.

A lip seal according to the present invention is shown in FIG. 3. In this arrangement the sealing element consisting of the contact pressure ring 1 and the sleeve 2 with the slits arranged therein is initially made in cylindrical form. When assembled to the stiffening ring and pushed onto the shaft, a differential elastic expansion of the seal is made, i.e., the end face and interior inside diameters are different. For example, the seal in the region of the sealing lip 11, rests on the surface of the sealed shaft 6, and the expansion corresponds here to the deformation resulting from the respective diameter of the sealed shaft. On the opposite end face, however, the expansion is determined by the relative relation to the stiffening ring 10. The latter has an inner projection 9 which is axially directed and is firmly mated by cementing or welding to the surfaces of an end face circular slot of the contact pressure ring which has a matched profile. The angle which the inside surface 8 assumes with the surface of the sealed shaft, is obtained from the relative difference of the elastic deformation of the sealing lip 11 and the end face joining the projection 9, as well as their mutual distance, i.e., the length of the seal. A customary angle of about 7° is typical for most applications.

The cone angle, at which the end face 7 is related to the surface of the sealed shaft, is determined by the degree of elastic deformation and by the bevel of the end face. The angle can therefore be adjusted to almost any desired value. Customary angles for the sealing of liquid are in the order of about 30°.

In FIG. 4, an embodiment is shown as an alternative to FIG. 3 with the differentiating features that the contact pressure ring is cemented to the projection of the stiffening ring only on the outer surface of the slot and that the portion 16 of the pressure ring located radially inward from the slot forms an additional sealing lip 12. The angles, at which the cone surfaces 13 and 14 rest on the surface of the sealed shaft can be varied in accordance with the explanations above with respect to surfaces 7 and 8 of FIG. 3.

We claim:

1. A shaft seal for preventing leakage around a rotating shaft, which comprises:
    a contact pressure ring of elastic material, and
    a multi-slitted, thin sleeve of polytetrafluoroethylene permanently joined to the inner wall of the ring,
    The slits forming an angle with the axis of shaft rotation of from about 5° to about 45° and extending radially through the complete sleeve and axially from one end of the sleeve to the other, and
    the inside diameter of the sleeve being smaller than the diameter of the shaft so that when the seal is assembled onto the shaft, the slits open to form channels through which the elastic material of the ring expands to contact the shaft.

2. A seal according to claim 1 wherein the ratio of the inside diameter of the sleeve to the outside diameter of the shaft is from about 0.85 to about 0.95.

3. A seal according to claim 1 or 2 wherein the slits are straight and form a uniform angle with the axis of rotation.

4. A seal according to claim 1 or 2 wherein the slits are curved and form a differential angle with the axis of rotation.

5. A seal according to claim 1 or 2 which further comprises a second set of slits in a mirror symmetry arrangement with the first set of slits.

6. A seal according to claim 5 wherein the first and second set of slits intersect each other.

7. A seal according to claim 4 wherein the average of the differential angle formed by each curved slit in relation to the axis of rotation is from about 10° to about 30°.

8. A gap seal according to claim 1 wherein the entire inner surface of the sleeve rests upon the shaft.

9. A lip seal according to claim 1 wherein at least one of the end faces of the pressure ring is beveled and the interior portion of the inner diameter surface of the seal is raised off the shaft to form at least one circular sealing lip.

10. A lip seal according to claim 9 which further comprises a stiffening ring with a circular projection which is mated to a circular slot in an end face of the pressure ring.

11. A lip seal according to claim 9 or 10 wherein one circular sealing lip is formed.

12. A lip seal according to claim 9 or 10 wherein two circular sealing lips are formed.

13. A seal according to claim 1 or 2 wherein after assembly of the seal, the sleeve material between the channels has the form of plates with parallel adjacent boundary edges and the ratio of the width of the plates in the circumferential direction to the width of the channels is a maximum of about 15.

14. A seal according to claim 1 or 2 wherein the pressure ring is elastic material.

15. A seal according to claim 1 or 2 which further comprises a flange-shaped member joined to a diaphragm-like circular member which is joined to an end face of the pressure ring.

16. A seal according to claim 1 or 2 wherein the helical twist of the angles of the slits in relation to the axis of rotation combines with the rotational movement of the shaft to produce a conveyance effect toward the sealed off medium.

17. A seal according to claim 1 or 2 wherein the sleeve is from about 0.2 to about 0.3 mm thick.

* * * * *